US011171813B2

(12) United States Patent
Chintalapudi et al.

(10) Patent No.: US 11,171,813 B2
(45) Date of Patent: Nov. 9, 2021

(54) BLIND DISTRIBUTED MULTI-USER MIMO FOR DECODING MULTIPLE CONCURRENT WIRELESS TRANSMISSIONS

(71) Applicant: Microsoft Technology Licensing, LLC, Redmond, WA (US)

(72) Inventors: Krishna Kant Chintalapudi, Redmond, WA (US); Nissanka Arachchige Bodhi Priyantha, Redmond, WA (US); Chuhan Gao, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 16/708,245

(22) Filed: Dec. 9, 2019

(65) Prior Publication Data
US 2021/0176098 A1 Jun. 10, 2021

(51) Int. Cl.
*H04L 25/02* (2006.01)
*H04L 27/00* (2006.01)
*H04B 7/0452* (2017.01)

(52) U.S. Cl.
CPC ....... *H04L 25/0238* (2013.01); *H04B 7/0452* (2013.01); *H04L 27/0014* (2013.01); *H04L 2027/0026* (2013.01)

(58) Field of Classification Search
CPC .......... H04L 27/34; H04L 1/00; H04L 25/03; H04B 17/309; H04W 4/08; H04W 36/18; H04W 68/00
See application file for complete search history.

(56) References Cited

U.S. PATENT DOCUMENTS

| 10,484,226 B2* | 11/2019 | Al-Dweik | H04L 25/022 |
| 2007/0087749 A1* | 4/2007 | Ionescu | H04L 5/0048 |
| | | | 455/436 |
| 2018/0176069 A1* | 6/2018 | Lee | H04L 27/2655 |

OTHER PUBLICATIONS

Gao, et al., "Blind Distributed MU-MIMO for IoT Networking over VHF Narrowband Spectrum", In Proceedings of the 25th Annual International Conference on Mobile Computing and Networking, Oct. 21, 2019, 17 Pages.

* cited by examiner

*Primary Examiner* — Iqbal Zaidi
(74) *Attorney, Agent, or Firm* — Ray Quinney & Nebeker; Thomas M. Hardman; Hannah Zhang

(57) ABSTRACT

Techniques for blind distributed multi-user MIMO enable simultaneous decoding of multiple concurrent wireless transmissions without the need for coordination between wireless devices or a measurement phase. Wireless devices are permitted to transmit independently and at arbitrary times. Concurrent transmissions from wireless devices superimpose in the wireless channel and are received at various base stations. The base stations forward received data samples to a central entity (e.g., a cloud computing service), which uses known preambles to reliably estimate CFOs and channels between the transmitting devices and the receiving base stations while simultaneously recovering the data samples of the individual data streams.

16 Claims, 9 Drawing Sheets

BLIND DISTRIBUTED MULTI-USER MIMO FOR DECODING MULTIPLE CONCURRENT WIRELESS TRANSMISSIONS

CROSS-REFERENCE TO RELATED APPLICATIONS

N/A

BACKGROUND

There are certain scenarios (e.g., Internet of Things (IoT) applications) in which it can be beneficial to have long-range wireless connectivity to devices. Having a longer range for wireless communication helps cover a vast geographical area with fewer base stations and consequently lowers network deployment and operational costs.

In some cases, narrowband channels can provide a longer range for wireless communication. The longer range can be attributable to various factors, such as a higher transmit power allowance and/or superior radio propagation characteristics.

Increased geographical coverage can mean that there are a larger number of wireless devices (e.g., IoT devices) communicating across a wireless link, which means that there can be a need to accommodate higher uplink network capacity. If narrowband channels are used for wireless communication, it can be beneficial to use distributed multiple input and multiple output (MIMO) techniques to increase capacity. Distributed MIMO is a method for increasing the capacity of a radio link using multiple transmission and receiving antennas to exploit multipath propagation. Distributed MIMO provides the promise of scaling capacity by enabling base stations to collaboratively decode concurrent transmissions.

With current approaches, in order to enable simultaneous decoding of multiple concurrent transmissions using distributed MIMO, the channel parameters and carrier frequency offsets (CFO) for all participating transmitter-receiver pairs must be known. Thus, communication in existing systems alternates between a measurement phase and a transmission phase. In the measurement phase, all participating transmitters and receivers coordinate to first conduct channel measurements and then all transmitters transmit concurrently.

However, there are some scenarios in which the current approach is not a viable option. In IoT networks, for example, it is not realistic to expect this manner of coordination between IoT devices and base stations, and the amount of overhead that is associated with a measurement phase would be impractical. A typical IoT network comprises power constrained IoT devices that predominantly sleep (i.e., turn radios off) and sporadically wake up on the occurrence of events to transmit short notification messages, which are typically a few bytes.

Accordingly, benefits may be realized by distributed MIMO techniques that do not require coordination between wireless devices or a measurement phase.

SUMMARY

In accordance with one aspect of the present disclosure, a method is disclosed that includes receiving data samples from a plurality of base stations. The data samples correspond to a plurality of signals that are transmitted by a plurality of wireless devices and received at the plurality of base stations. The method also includes detecting, based on the data samples, a known preamble indicating a new packet transmission. The method also includes using known preamble samples to attempt to simultaneously estimate carrier frequency offsets (CFOs) and channel parameters corresponding to the plurality of wireless devices and the plurality of base stations and message data samples corresponding to messages sent by individual wireless devices.

In some embodiments, there are not be any coordinated channel measurements between the plurality of wireless devices and the plurality of base stations. Instead, the plurality of wireless devices are allowed to transmit independently and at arbitrary times.

The method may further include entering a blind estimation state in response to detecting the known preamble and estimating the CFOs, the channel parameters, and the message data samples while in the blind estimation state.

The method may further include entering a steady state after the CFOs and the channel parameters have been estimated and while in the steady state, using the estimated CFOs and the estimated channel parameters to estimate the message data samples.

The method may further include entering a blind estimation state in response to detecting another new packet transmission while in the steady state.

There may be $N_T$ concurrent transmissions received at $N_R$ receivers in a previous steady state phase. The method may further include entering a blind estimation state in response to arrival of $\mathcal{K}$ new packets. Simultaneously estimating the CFOs, the channel parameters, and the message data samples may include waiting until M preamble samples have been received and then solving $N_R \cdot M$ non-linear equations for $N_T \cdot M$ data sample variables, $\mathcal{K}$ CFO variables, and $\mathcal{K} \cdot N_R$ channel variables.

The method may further include detecting that at least one condition that is necessary for successfully performing blind estimation is not satisfied and instructing the plurality of base stations to signal the plurality of wireless devices to temporarily discontinue transmitting.

In some embodiments, there may be $N_T$ concurrent transmissions received at $N_R$ receivers in a previous steady state phase, and $\mathcal{K}$ new packets may be received in a current blind estimation phase. M samples may be received in the current blind estimation phase. The at least one condition may include a blind estimation sufficiency condition. The blind estimation sufficiency condition may be expressed as $MN_R \geq MN_T + (N_R+1)\mathcal{K}$.

In some embodiments, there may be $N_T$ concurrent transmissions received at $N_R$ receivers. The at least one condition may include a minimum number of receivers condition. The minimum number of receivers condition may be represented as $N_R > N_T$.

In some embodiments, there may be $N_T$ concurrent transmissions received at $N_R$ receivers in a previous steady state phase, and $\mathcal{K}$ new packets may be received in a current blind estimation phase. M samples may be received in the current blind estimation phase. The at least one condition may include a burst limit condition. The burst limit condition may be expressed as $$\mathcal{K} \leq \frac{(N_R - N_T)L_P}{N_R + 1}.$$

Communication between the plurality of wireless devices and the plurality of base stations may occur via wireless channels and the wireless channels may each be represented by a single complex number.

The plurality of wireless devices may include a plurality of Internet of Things (IoT) devices. The method may be performed by a cloud computing service. The cloud computing service may receive the data samples from the plurality of base stations via an Internet connection.

In accordance with another aspect of the present disclosure, a computer-readable medium is disclosed. The computer-readable medium includes instructions that are executable by one or more processors to cause a computing system to receive data samples from a plurality of base stations. The data samples correspond to a plurality of signals that are transmitted by a plurality of wireless devices and received at the plurality of base stations. The plurality of wireless devices transmit independently and at arbitrary times. The computer-readable medium also includes instructions that are executable by the one or more processors to cause the computing system to detect, based on the data samples, a known preamble indicating a new packet transmission. The computer-readable medium also includes instructions that are executable by the one or more processors to cause the computing system to enter a blind estimation state in response to detecting the known preamble. The computer-readable medium also includes instructions that are executable by the one or more processors to cause the computing system to, while in the blind estimation state, using known preamble samples to attempt to simultaneously estimate carrier frequency offsets (CFOs) and channel parameters corresponding to the plurality of wireless devices and the plurality of base stations and message data samples corresponding to messages sent by individual wireless devices.

The computer-readable medium may further include additional instructions that are executable by the one or more processors to enter a steady state after the CFOs and the channel parameters have been estimated. The computer-readable medium may further include additional instructions that are executable by the one or more processors to, while in the steady state, use the estimated CFOs and the estimated channel parameters to estimate the message data samples. The computer-readable medium may further include additional instructions that are executable by the one or more processors to re-enter the blind estimation state in response to detecting another new packet transmission while in the steady state.

There may be $N_T$ concurrent transmissions received at $N_R$ receivers in a previous steady state phase. The blind estimation state may be entered in response to arrival of $\mathcal{K}$ new packets. Simultaneously estimating the CFOs, the channel parameters, and the message data samples may include waiting until M preamble samples have been received and then solving $N_R \cdot M$ non-linear equations for $N_T \cdot M$ data sample variables, $\mathcal{K}$ CFO variables, and $\mathcal{K} \cdot N_R$ channel variables.

The computer-readable medium may further include additional instructions that are executable by the one or more processors to detect that at least one condition that is necessary for successfully performing blind estimation is not satisfied and instruct the plurality of base stations to signal the plurality of wireless devices to temporarily discontinue transmitting.

The at least one condition may include at least one of a blind estimation sufficiency condition, a minimum number of receivers condition, or a burst limit condition.

In accordance with another aspect of the present disclosure, a system is disclosed. The system includes one or more processors, memory in electronic communication with the one or more processors, and instructions stored in the memory. The instructions are executable by the one or more processors to receive data samples from a plurality of base stations. The data samples correspond to a plurality of signals that are transmitted by a plurality of wireless devices and received at the plurality of base stations. The plurality of wireless devices transmit independently and at arbitrary times. The instructions are also executable by the one or more processors to detect, based on the data samples, a known preamble indicating a new packet transmission. The instructions are also executable by the one or more processors to enter a blind estimation state in response to detecting the known preamble. The instructions are also executable by the one or more processors to, while in the blind estimation state, using known preamble samples to simultaneously estimate carrier frequency offsets (CFOs), channel parameters corresponding to the plurality of wireless devices and the plurality of base stations, and message data samples corresponding to messages sent by individual wireless devices. The instructions are also executable by the one or more processors to enter a steady state after the CFOs and the channel parameters have been estimated. The instructions are also executable by the one or more processors to re-enter the blind estimation state in response to detecting another new packet transmission while in the steady state.

There may be $N_T$ concurrent transmissions received at $N_R$ receivers in a previous steady state phase. The blind estimation state may be entered in response to arrival of $\mathcal{K}$ new packets. Simultaneously estimating the CFOs, the channel parameters, and the message data samples may include waiting until M preamble samples have been received and then solving $N_R \cdot M$ non-linear equations for $N_T \cdot M$ data sample variables, $\mathcal{K}$ CFO variables, and $\mathcal{K} \cdot N_R$ channel variables.

The system may further include additional instructions that are executable by the one or more processors to detect that at least one condition that is necessary for successfully performing blind estimation is not satisfied and instruct the plurality of base stations to signal the plurality of wireless devices to temporarily discontinue transmitting.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
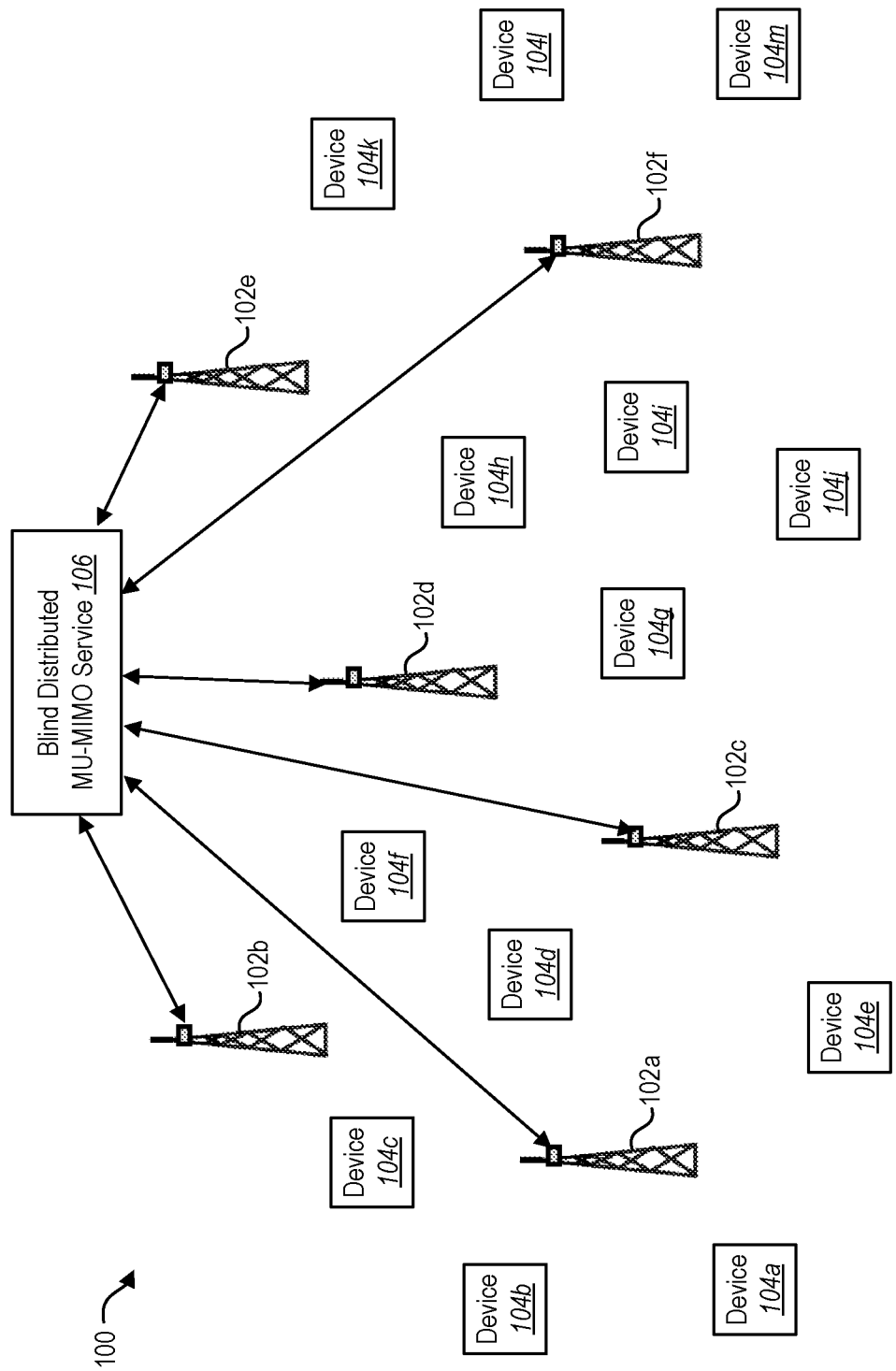
FIG. 1 illustrates an example of a wireless communication system in which the techniques disclosed herein can be implemented.

The present disclosure is generally related to techniques for blind distributed multi-user MIMO (MU-MIMO). The techniques disclosed herein enable simultaneous decoding of multiple concurrent wireless transmissions without the need for coordination between wireless devices or a measurement phase. Wireless devices are permitted to transmit independently and at arbitrary times.

In accordance with the present disclosure, concurrent transmissions from wireless devices (which may all have started at different points in time from different wireless devices) superimpose in the wireless channel and are received at various base stations. The base stations then forward received data samples to a central entity, which may be implemented in the cloud. This central entity may be referred to herein as a blind distributed MU-MIMO service. The blind distributed MU-MIMO service decomposes the received signals into individual streams of data samples from each of the transmitting devices. Advantageously, the blind distributed MU-MIMO service is able to use known preambles to reliably estimate CFOs and channels between the transmitting devices and the receiving base stations while simultaneously recovering the data samples of the individual data streams.

A blind distributed MU-MIMO service in accordance with the present disclosure can be configured to operate in at least three different states: an idle state, a blind estimation state, and a steady state. The blind distributed MU-MIMO service can begin in the idle state corresponding to a point in time when there are no ongoing transmissions being received at the base stations. Upon detecting one or more new preambles indicating new packet transmissions, the blind distributed MU-MIMO service can transition into the blind estimation state. While in the blind estimation state, the blind distributed MU-MIMO service can perform decoding while simultaneously estimating the CFOs and the channels between all transmitter-receiver pairs. Once the CFOs and the channels have been estimated, the blind distributed MU-MIMO service can transition into the steady state. In the steady state, estimating the next data samples for each transmission is akin to standard MIMO decoding.

In the steady state, if a preamble is detected, the blind distributed MU-MIMO service can once again enter the blind estimation state because there are one or more new transmissions whose CFOs and channels are unknown, thereby making it impossible to estimate the data samples for the already ongoing transmissions. However, the first few data samples of the new transmissions are already known since they are preambles. Estimation of data samples and decoding is delayed until enough samples of the known preambles have been accumulated to allow joint estimation of all unknown CFOs, unknown channels, and the pending unknown data samples. Then, having once again estimated all the channel parameters and CFOs, the blind distributed MU-MIMO service can resume its steady state decoding.

FIG. 1 illustrates an example of a wireless communication system 100 in which the techniques disclosed herein can be implemented. The wireless communication system 100 includes a plurality of base stations 102a-f and a plurality of wireless devices 104a-m.

The base stations 102a-f are in electronic communication with a blind distributed MU-MIMO service 106. The blind distributed MU-MIMO service 106 can be implemented using one or more computing devices. In some embodiments, the blind distributed MU-MIMO service 106 can be implemented as a cloud computing service. Each of the base stations 102a-f can communicate with the blind distributed MU-MIMO service 106 through a connection to the Internet.

The blind distributed MU-MIMO service 106 is able to decode concurrent transmissions from the wireless devices 104a-m without the need for a measurement phase in which the wireless devices 104a-m and the base stations 102a-f coordinate with one another. It is also not necessary for all of the wireless devices 104a-m to transmit concurrently. Instead, the wireless devices 104a-m can transmit independently and at arbitrary times. Thus, the blind distributed MU-MIMO service 106 is able to decode concurrent transmissions from different wireless devices 104a-m that may start and end at different points in time.

Concurrent transmissions from the wireless devices 104a-m become superimposed on one another and are received at the base stations 102a-f. The base stations 102a-f then forward data samples corresponding to the received signals to the blind distributed MU-MIMO service 106, which uses known preambles to estimate CFOs and channels between the wireless devices 104a-m and the base stations 102a-f while simultaneously recovering the data samples of the individual data streams from the wireless devices 104a-m.

Figure 2:
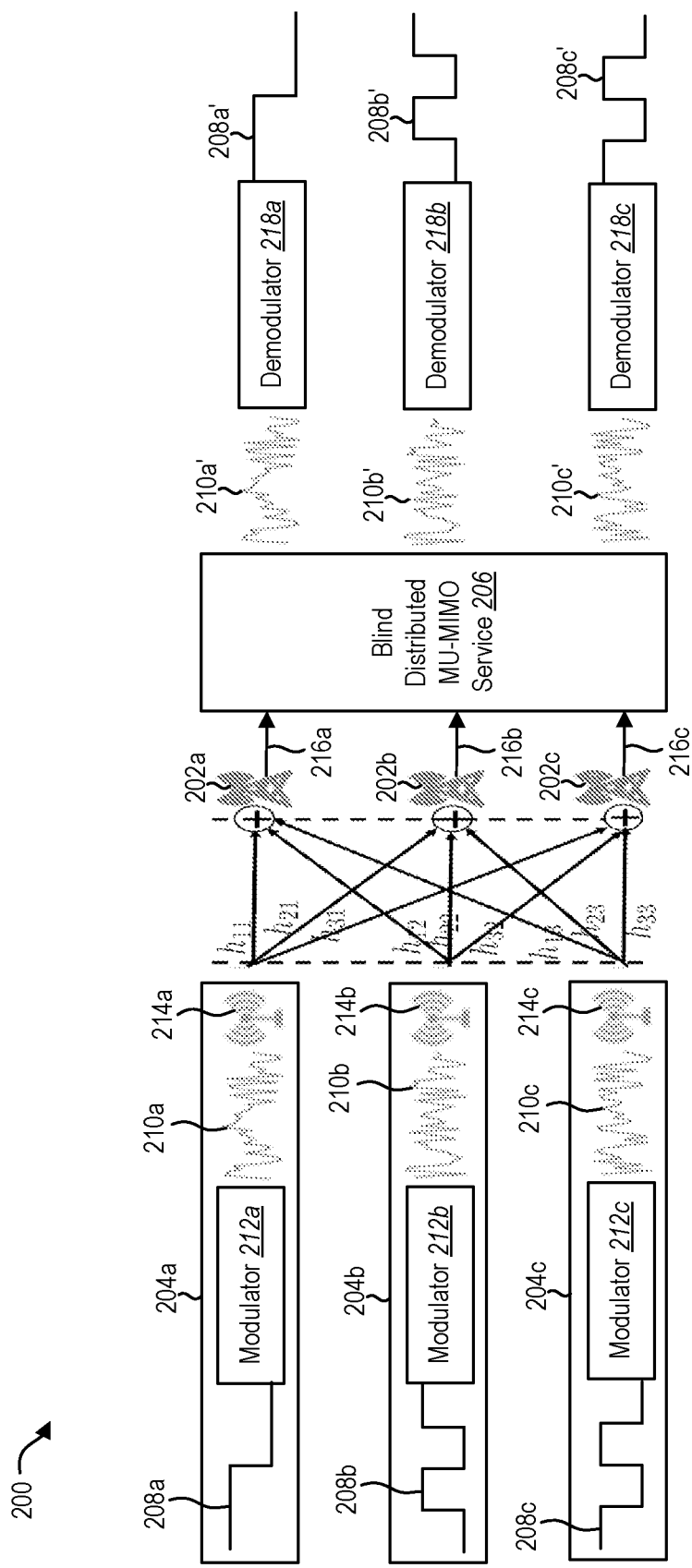
FIG. 2 illustrates an example showing how a blind distributed multi-user MIMO service can recover data samples of individual data streams transmitted by a plurality of wireless devices.

FIG. 2 illustrates an example showing how a blind distributed MU-MIMO service 206 can recover data samples of individual data streams transmitted by a plurality of wireless devices 204a-c. In this example, it will be assumed that there are three wireless devices 204a-c and three base stations 202a-c. The base stations 202a-c are in electronic communication with the blind distributed MU-MIMO service 206, which can be implemented as a cloud computing service.

The wireless devices 204a-c generate and send messages 208a-c that are received by the base stations 202a-c. More specifically, the messages 208a-c are modulated and sampled, thereby producing data samples 210a-c corresponding to the messages 208a-c. These data samples 210a-c may be referred to herein as message data samples 210a-c. The message data samples 210a-c represent modulated and sampled versions of the messages 208a-c. The message data samples 210a-c can be I/Q data samples.

The message data samples 210a-c are transmitted to the base stations 202a-c. The wireless devices 204a-c are shown with modulators 212a-c that perform modulation on the messages 208a-c, and transmitters 214a-c that transmit the message data samples 210a-c to the base stations 202a-c. In some embodiments, the wireless devices 204a-c can be IoT devices, and the messages 208a-c can be notification messages that are generated by the IoT devices.

The transmission of the message data samples 210a-c does not necessarily begin and end at the same time. Instead, the wireless devices 204a-c are able to transmit independently and at arbitrary times. Thus, the transmission of the message data samples 210a from the first wireless device 204a may begin and end at a different time than the transmission of the message data samples 210b from the second wireless device 204b, which may begin and end at a different time than the transmission of the message data samples 210c from the third wireless device 204c. However, for purposes of the present discussion, it will be assumed that there is some overlap between the transmission of the message data samples 210a-c. In other words, it will be assumed that there is some period of time during which the transmission of each of the message data samples 210a-c is ongoing, even if the starting times and ending times of the transmissions are different. Thus, it will be assumed that there are concurrent transmissions from the wireless devices 204a-c (i.e., during the period of time when the transmission of each of the message data samples 210a-c is ongoing), and the blind distributed MU-MIMO service 206 is able to decode these concurrent transmissions.

The message data samples 210a-c are transmitted as wireless signals, and these wireless signals become superimposed one on another as they are transmitted from the wireless devices 204a-c to the base stations 202a-c. Each of the base stations 202a-c receives signals that include some combination of the message data samples 210a-c transmitted by all of the wireless devices 204a-c. The base stations 202a-c send data samples 216a-c corresponding to the received signals to the blind distributed MU-MIMO service 206. For example, the first base station 202a receives signals that includes some combination of the message data samples 210a-c transmitted by the wireless devices 204a-c, and then the first base station 202a sends data samples 216a corresponding to those received signals to the blind distributed MU-MIMO service 206. Similarly, the second base station 202b sends data samples 216b corresponding to the signals that the second base station 202b receives from the wireless devices 204a-c, and the third base station 202c sends data samples 216c corresponding to the signals that the third base station 202c receives from the wireless devices 204a-c.

The blind distributed MU-MIMO service 206 receives the data samples 216a-c from the base stations 202a-c and separates the data samples 216a-c into individual streams of message data samples 210a'-c' corresponding to the message data samples 210a-c that were transmitted by the wireless devices 204a-c. In particular, the first stream of message data samples 210a' corresponds to the message data samples 210a transmitted by the first wireless device 204a, the second stream of message data samples 210b' corresponds to the message data samples 210b transmitted by the second wireless device 204b, and the third stream of message data samples 210c' corresponds to the message data samples 210c transmitted by the third wireless device 204c.

The message data samples 210a'-c' are demodulated, thereby producing messages 208a'-c' corresponding to the original messages 208a-c that were generated and sent by the wireless devices 204a-c. The system 200 shown in FIG. 2 includes demodulators 218a-c for demodulating the message data samples 210a'-c' that are output by the blind distributed MU-MIMO service 206.

Advantageously, the blind distributed MU-MIMO service 206 can even work with non-linear and noncoherent modulations (e.g., frequency shift keying) since it can separate concurrent transmissions at the I/Q sample level.

Figure 3:
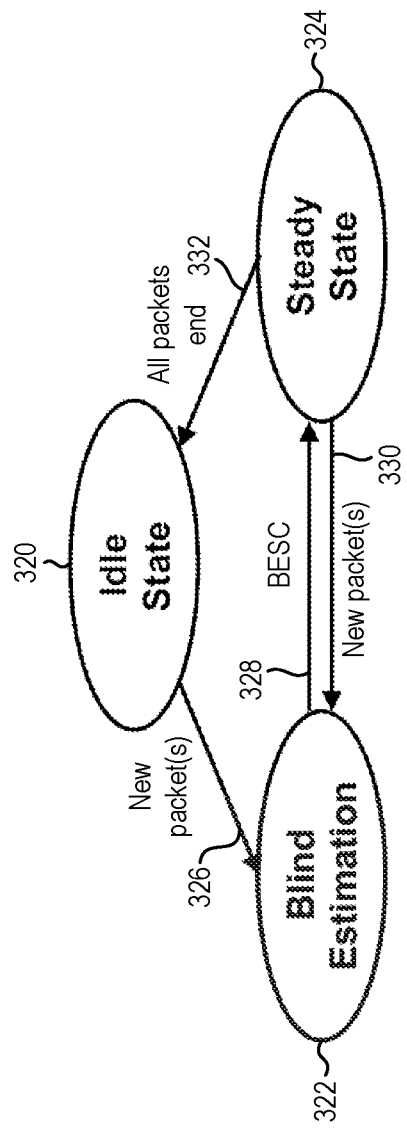
FIG. 3 illustrates an example of a state diagram that represents possible states in which a blind distributed multi-user MIMO service can operate.

FIG. 3 illustrates an example of a state diagram that represents possible states in which a blind distributed MU-MIMO service can operate. The example shown in FIG. 3 will be described in relation to the blind distributed MU-MIMO service 206 in the system 200 shown in FIG. 2. Referring to both FIG. 2 and FIG. 3, the blind distributed MU-MIMO service 206 can be configured to operate in at least three different states: an idle state 320, a blind estimation state 322, and a steady state 324.

As discussed above, FIG. 2 shows the blind distributed MU-MIMO service 206 in electronic communication with a plurality of base stations 202a-c, which receive wireless transmissions from a plurality of wireless devices 204a-c. When there are no ongoing transmissions from the wireless devices 204a-c being received at any of the base stations 202a-c, the blind distributed MU-MIMO service 206 can operate in the idle state 320.

When one or more of the wireless devices 204a-c transmit messages, wireless signals comprising those messages are received at the base stations 202a-c. The base stations 202a-c then forward data samples corresponding to the received signals to the blind distributed MU-MIMO service 206. The messages sent by the wireless devices 204a-c begin with a known preamble. In this context, the term "known preamble" can refer to a preamble that is known to the blind distributed MU-MIMO service 206. When the blind distributed MU-MIMO service 206 detects the preamble, this means that one or more new packets containing messages transmitted by the wireless devices 204a-c have been received at the base stations 202a-c. In response, the blind distributed MU-MIMO service 206 transitions 326 from the idle state 320 into the blind estimation state 322.

While operating in the blind estimation state 322, the blind distributed MU-MIMO service 206 uses the known preambles to estimate CFOs and channels between the wireless devices 204a-c and the base stations 202a-c while simultaneously estimating the data samples of the individual data streams from the wireless devices 204a-c.

Once the CFOs and channels have been estimated, the blind distributed MU-MIMO service 206 transitions 328 from the blind estimation state 322 into the steady state 324. FIG. 3 shows the blind distributed MU-MIMO service 206 transitioning 328 from the blind estimation state 322 into the steady state 324 in response to a blind estimation sufficiency condition (BESC) being satisfied. The BESC will be discussed in greater detail below.

In the steady state 324, the blind distributed MU-MIMO service 206 uses the estimated CFOs and the estimated channels to estimate the data samples of the individual data streams from the wireless devices 204a-c, in a manner similar to standard MIMO decoding.

If the blind distributed MU-MIMO service 206 detects the preamble when the blind distributed MU-MIMO service 206 is operating in the steady state 324, this means that one or more new packets containing messages transmitted by the wireless devices 204a-c have been received at the base stations 202a-c. Because all of the transmissions from the wireless devices 204a-c are superimposed in the wireless channel, the new transmissions make it impossible to estimate the data samples for the already ongoing transmissions, because the CFOs and channel parameters are now unknown. Consequently, the blind distributed MU-MIMO service 206 transitions 330 from the steady state 324 back into the blind estimation state 322. At this point, estimation of data samples and decoding is delayed until enough samples of the known preamble(s) have been accumulated to allow joint estimation of all unknown CFOs, unknown channels, and the pending unknown data samples. Then, having once again estimated all the channel parameters and CFOs, the blind distributed MU-MIMO service 206 can transition 328 back into the steady state 324 and resume its steady state decoding.

Once the blind distributed MU-MIMO service 206 has estimated all of the data samples for the already ongoing transmissions and the transmissions have ended, then the blind distributed MU-MIMO service 206 can transition 332 back into the idle state 320. In the idle state, the blind distributed MU-MIMO service 206 waits for new packets to arrive. As long as there are no ongoing transmissions from the wireless devices 204a-c being received at any of the base stations 202a-c, the blind distributed MU-MIMO service 206 can remain in the idle state 320. When the blind distributed MU-MIMO service 206 detects the preamble again (meaning that one or more new packets containing messages transmitted by the wireless devices 204a-c have been received at the base stations 202a-c), the blind distributed MU-MIMO service 206 can transition 326 from the idle state 320 into the blind estimation state 322, and the process described above can be repeated.

Figure 4A:
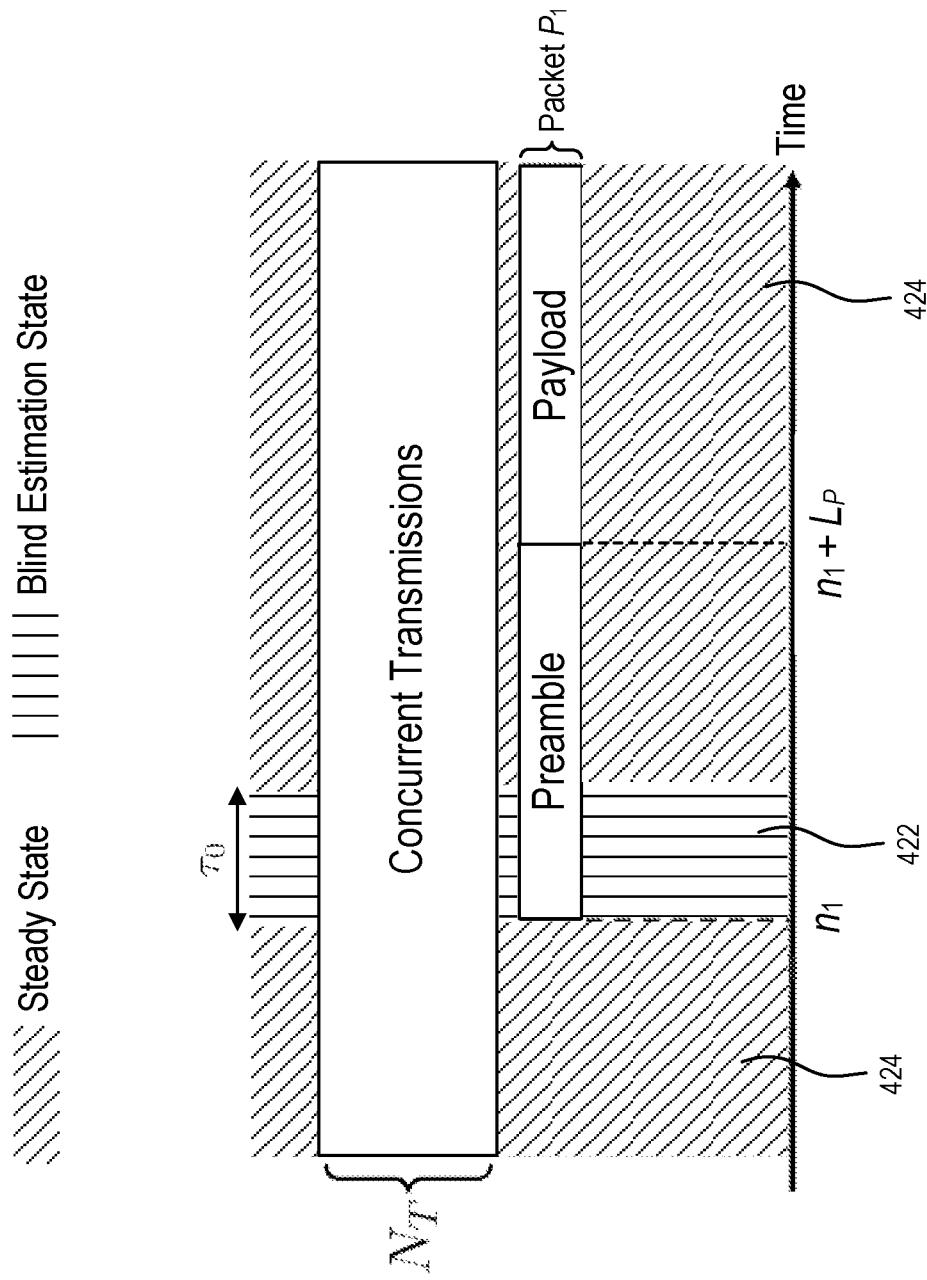
FIGS. 4A-C illustrate different examples of scenarios in which a blind distributed multi-user MIMO service receives one or more new packets while operating in a steady state.
Figure 4B:
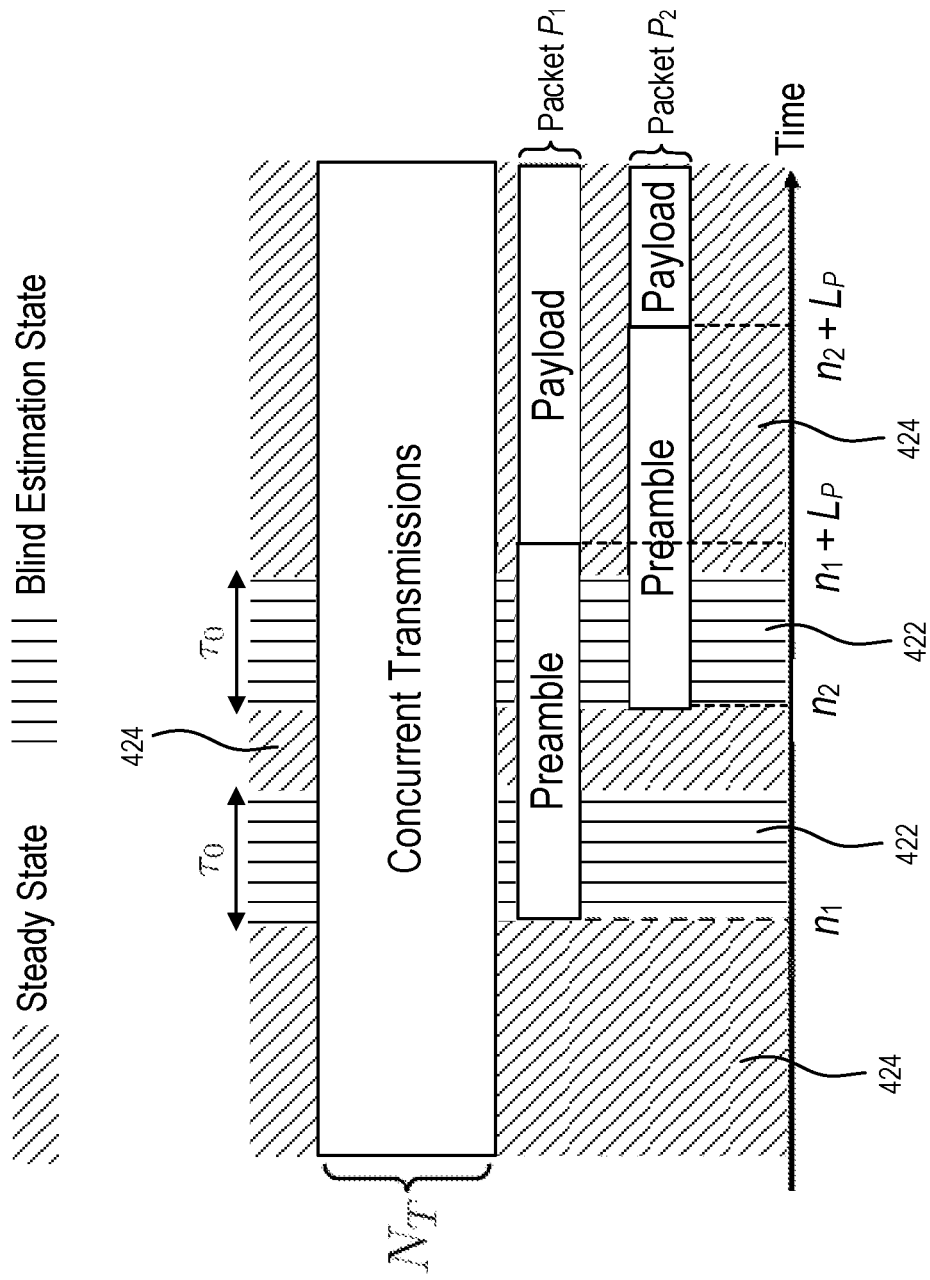
Figure 4C:
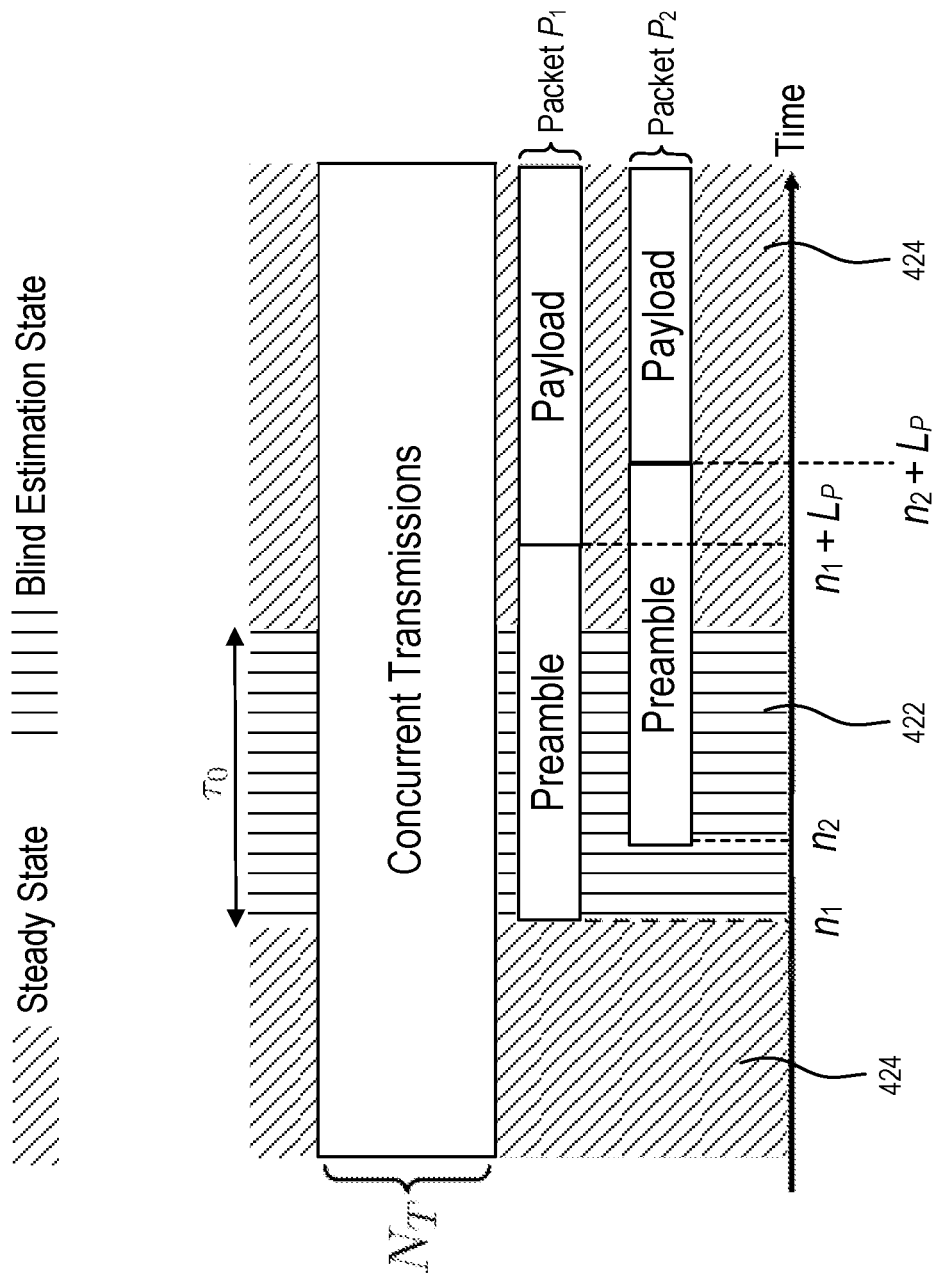

FIGS. 4A-C illustrate several different examples of scenarios in which a blind distributed MU-MIMO service receives one or more new packets while operating in a steady state. Referring initially to FIG. 4A, suppose that $N_T$ concurrent transmissions are being received at a plurality of base stations. The base stations forward data samples corresponding to the concurrent transmissions to the blind distributed MU-MIMO service. Once the CFOs and channel parameters corresponding to the $N_T$ concurrent transmissions have been estimated, the blind distributed MU-MIMO service operates in the steady state 424.

FIG. 4A shows a new transmission (packet $P_1$) beginning at sample $n_1$. From some prior point in time (when the CFOs and channel parameters corresponding to the $N_T$ concurrent transmissions are estimated) until sample $n_1-1$, the blind distributed MU-MIMO service operates in the steady state 424 and the samples of all $N_T$ concurrent transmissions are decoded using steady state decoding. However, beginning at sample $n_1$, the blind distributed MU-MIMO service does not know the CFO and the channel parameters for the new transmission. Therefore, the blind distributed MU-MIMO service can no longer estimate data samples of the ongoing transmissions using steady state decoding, and consequently the blind distributed MU-MIMO service enters the blind estimation state 422.

The blind distributed MU-MIMO service detects the new transmission (packet $P_1$) after it has received the entire packet preamble. FIG. 4A shows packet $P_1$ being detected at sample $n_1+L_P$, where $L_P$ represents the length of the packet preamble. Thus, the blind distributed MU-MIMO service can only be certain about the number of active transmissions for samples that were received $L_P$ samples before the current sample. Consequently, the blind distributed MU-MIMO service can be configured to maintain a buffer of at least $L_P+1$ samples.

While the blind distributed MU-MIMO service is operating in the steady state 424 prior to sample $n_1$, there are $N_T$ unknowns corresponding to the samples of each transmission. At sample $n_1$, since the preamble is known, there are now $N_T+2*N_R$ unknowns, including the CFOs and channel parameters for the ongoing transmissions. (In this context, the term $N_R$ refers to the number of receivers that are receiving the ongoing transmissions.) Consequently, in order to estimate the data samples of the ongoing transmissions, the blind distributed MU-MIMO service must jointly estimate all these variables from the received transmissions at $N_R$ receivers. In general, $\tau$ samples into the new transmission's preamble (i.e., at sample $n_1+\tau$), the blind distributed MU-MIMO service must jointly estimate $2*N_R+\tau N_T$ unknowns corresponding to all the unestimated samples from ongoing transmissions thus far from $N_R*\tau$ received samples.

Suppose that at $\tau=\tau_0$ samples, the blind distributed MU-MIMO service has enough samples to solve for all the $2*N_R+\tau_0 N_T$ unknowns accumulated thus far. At this point, the blind distributed MU-MIMO service can use blind estimation to jointly solve for all the unknowns and thus estimate CFOs and channel parameters while simultaneously estimating the data samples of the $N_T$ concurrent transmissions. The blind distributed MU-MIMO service can then enter the steady state 424.

Reference is now made to FIG. 4B. The example shown in FIG. 4B is similar in some respects to the example discussed above in connection with FIG. 4A. In particular, it will be assumed that $N_T$ concurrent transmissions are being received at a plurality of base stations, and that the blind distributed MU-MIMO service enters the steady state 424 once the CFOs and channel parameters corresponding to the $N_T$ concurrent transmissions have been estimated.

In the example shown in FIG. 4B, however, two new transmissions are received (instead of just one new transmission, as in FIG. 4A) after the blind distributed MU-MIMO service enters the steady state 424. These new transmissions will be referred to as packet $P_1$ and packet $P_2$.

Packet $P_1$ is received at sample $n_1$ (as in FIG. 4A). This new transmission is handled in the manner described above in connection with FIG. 4A. In particular, the blind distributed MU-MIMO service transitions to the blind estimation state 422 in response to receiving packet $P_1$, and then the blind distributed MU-MIMO service waits until it has received enough samples (represented as $\tau_0$ samples) to be able to use blind estimation to jointly estimate CFOs and channel parameters while simultaneously estimating the data samples of the $N_T$ concurrent transmissions. Once the CFOs and channel parameters have been estimated, the blind distributed MU-MIMO service then transitions back to the steady state 424.

Packet $P_2$ is received at sample $n_2$. In the depicted example, it will be assumed that the blind distributed MU-MIMO service re-enters the steady state 424 before sample $n_2$ is processed. In other words, it will be assumed that (i) the blind distributed MU-MIMO service is able to jointly estimate CFOs, channel parameters, and the data samples of the $N_T$ concurrent transmissions at sample $n_1+\tau_0$, and (ii) sample $n_1+\tau_0$ occurs before sample $n_2$. Thus, the blind distributed MU-MIMO service transitions from the blind estimation state 422 to the steady state 424 when sample $n_1+\tau_0$ is processed, and then the blind distributed MU-MIMO service re-enters the blind estimation state 422 when sample $n_2$ is processed (indicating the start of packet $P_2$).

As before, the blind distributed MU-MIMO service detects a new transmission after it has received the entire packet preamble. Thus, FIG. 4B shows packet $P_1$ being detected at sample $n_1+L_P$ and packet $P_2$ being detected at sample $n_2+L_P$, where $L_P$ represents the length of the packet preamble. The blind distributed MU-MIMO service can maintain a buffer of at least $L_P+1$ samples. Thus, sample $n_1$ can be processed after sample $n_1+L_P$ is received, and sample $n_2$ can be processed after sample $n_2+L_P$ is received.

Reference is now made to FIG. 4C. The example shown in FIG. 4C is similar in many respects to the example discussed above in connection with FIG. 4B. In particular, it will be assumed that $N_T$ concurrent transmissions are being received at a plurality of base stations, and that the blind distributed MU-MIMO service enters the steady state 424 once the CFOs and channel parameters corresponding to the $N_T$ concurrent transmissions have been estimated. In addition, as in the example shown in FIG. 4B, two new transmissions are received after the blind distributed MU-MIMO service enters the steady state 424. These new transmissions will be referred to as packet $P_1$ and packet $P_2$.

In the example shown in FIG. 4C, however, the blind distributed MU-MIMO service does not receive enough samples of the preamble of packet $P_1$ in order to be able to jointly estimate CFOs, channel parameters, and data samples of the $N_T$ concurrent transmissions before packet $P_2$ is received. Therefore, the blind distributed MU-MIMO service is not able to transition from the blind estimation state 422 to the steady state 424 before packet $P_2$ is received.

The new transmission (packet $P_2$) adds an additional $2N_R$ unknowns to be estimated. This has the effect of increasing the value of $\tau_0$, which represents the minimum samples needed before all the unknowns can be solved using blind estimation after which the blind distributed MU-MIMO service is able to perform steady state decoding. Thus, the value of $\tau_0$ depends on the number of unknown transmissions that keep arriving while the blind distributed MU-MIMO service is in the blind estimation state 422.

It is possible that too many new packets arrive too quickly, leaving insufficient samples to jointly estimate CFOs, channel parameters, and data samples of the concurrent transmissions. This can cause the decoding of the blind distributed MU-MIMO service to fail. This scenario will be discussed below, along with other possible failures and their impacts. Similar to all MIMO systems, the number of concurrent packets that can be supported is related to the number of receivers.

Figure 5:
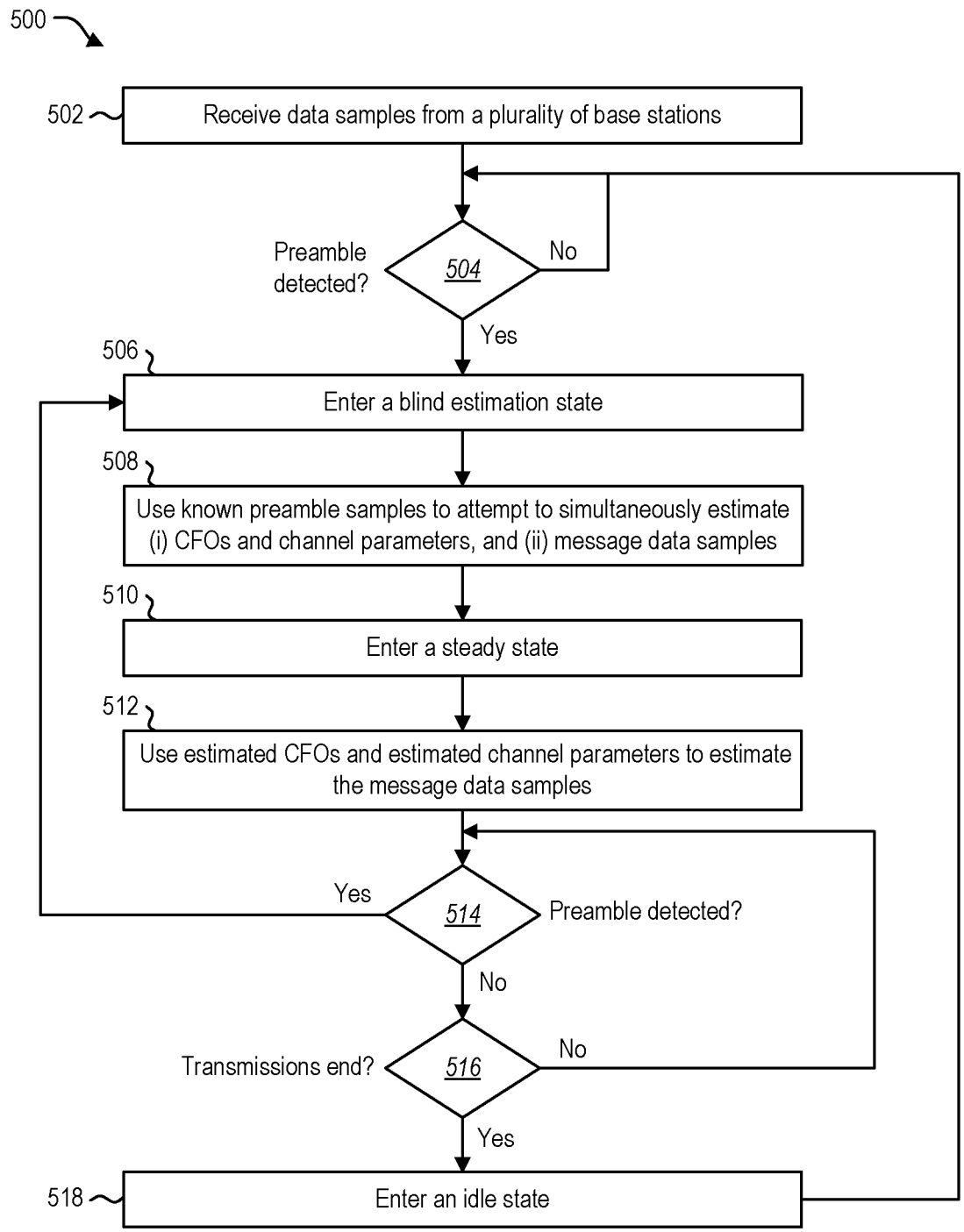
FIG. 5 illustrates an example of a method that can be implemented by a blind distributed MU-MIMO service in accordance with the present disclosure.

FIG. 5 illustrates an example of a method 500 that can be implemented by a blind distributed MU-MIMO service in accordance with the present disclosure. The method 500 will be described in relation to the blind distributed MU-MIMO service 206 in the system 200 shown in FIG. 2 as well as the state diagram shown in FIG. 3. As discussed above, the system 200 shown in FIG. 2 includes a plurality of base stations 202a-c and a plurality of wireless devices 204a-c. The base stations 202a-c are in electronic communication with the blind distributed MU-MIMO service 206.

The method 500 includes receiving 502 data samples 216a-c from the plurality of base stations 202a-c. The data samples 216a-c can correspond to a plurality of wireless signals that are transmitted by the plurality of wireless devices 204a-c and received at the plurality of base stations 202a-c. The wireless signals can each begin with a known preamble (i.e., a preamble that is known to the blind distributed MU-MIMO service 206). The method 500 can also include monitoring the received data samples 216a-c for the purpose of trying to detect the known preamble.

In response to detecting 504 the known preamble, the blind distributed MU-MIMO service 206 can enter 506 a blind estimation state 322. While in the blind estimation state 322, the blind distributed MU-MIMO service 206 can use known preamble samples to attempt to simultaneously estimate (i) CFOs and channel parameters corresponding to the plurality of wireless devices 204a-c and the plurality of base stations 202a-c, and (ii) message data samples 210a'-c' corresponding to messages 208a-c that are sent by individual wireless devices 204a-c.

Once the CFOs and the channel parameters have been estimated 508, the blind distributed MU-MIMO service 206 can enter 510 a steady state 324. While in the steady state 324, the blind distributed MU-MIMO service 206 can use the estimated CFOs and the estimated channel parameters to estimate 512 the message data samples 210a'-c'.

If another preamble is detected 514 while the blind distributed MU-MIMO service 206 is in the steady state 324, then the blind distributed MU-MIMO service 206 can re-enter 506 the blind estimation state 322. The method 500 can then proceed as described above.

When transmissions from the plurality of wireless devices 204a-c end 516, then the blind distributed MU-MIMO service 206 can enter 518 an idle state 320. The blind distributed MU-MIMO service 206 can re-enter 506 the blind estimation state 322 when another preamble is detected 504.

Advantageously, the method 500 can be performed without any coordinated channel measurements between the plurality of wireless devices 204a-c and the plurality of base stations 202a-c. Instead, the plurality of wireless devices 204a-c can be permitted to transmit independently and at arbitrary times.

As indicated above, the blind distributed MU-MIMO service 206 can use known preamble samples to attempt to simultaneously estimate (i) CFOs and channel parameters corresponding to the plurality of wireless devices 204a-c and the plurality of base stations 202a-c, and (ii) message data samples 210a'-c' corresponding to messages 208a-c that are sent by individual wireless devices 204a-c. An example showing how the simultaneous estimation of (i) and (ii) can occur will now be described.

Suppose that there are $N_T$ concurrent transmissions received at $N_R$ receivers in a previous steady state phase (i.e., a period of time during which the blind distributed MU-MIMO service 206 operates in the steady state 324), and that the blind estimation state 322 is entered in response to arrival of $\mathcal{K}$ new packets. In some embodiments, simultaneously estimating the CFOs, the channels, and the message data samples comprises waiting until M preamble samples have been received and then solving $N_R \cdot M$ non-linear equations for $N_T \cdot M$ data sample variables, $\mathcal{K}$ CFO variables, and $\mathcal{K} \cdot N_R$ channel variables.

A more detailed explanation of how this can occur will be provided below. First, however, an example will be described showing how steady state decoding can be performed. In this context, the term "steady state decoding" can refer to estimating data samples of concurrent transmissions while the blind distributed MU-MIMO service is in the steady state.

The received I/Q samples $y_i$ at receiver i are a superposition of the signals received from all transmitters that are in range:

$$y_i[n] = \sum_{k}^{N_T} h_{ik} \cdot e^{j2\pi \Delta f_{ik} n T_s} \cdot x_k[n] \quad (1)$$

In equation (1), n is the discrete sample time index, and $T_s$ is the sample duration. The term $x_k[n]$ is transmitter k's complex sample. The terms $\Delta f_{ik}$ and $h_{ik}$ represent the CFO and complex channel between transmitter k and receiver i.

As indicated above, $h_{ik}$ is a single complex number. Equation (1) is independent of the modulation scheme. Thus, equation (1) applies to even non-linear modulation schemes such as frequency shift keying (FSK).

If there are $N_T$ concurrent transmissions being received at $N_R$ receivers, based on equation (1) the following relationship can be established:

$$x[n]=H[n]x[n] \quad (2)$$

In equation (2), $x[n]=[x_1[n], x_2[n], \ldots, x_{N_T}[n]]^T$, $y[n]=[y_1[n], y_2[n], \ldots, y_{N_R}[n]]^T$, and $H[n]$ is a matrix with $$h_{ik} e^{j2\pi \Delta f_{ik} nT_s}$$

as its elements. In the steady state, knowing all $h_{ik}$ and $\Delta f_{ik}$, $y[n]$ can be solved using the pseudo-inverse of H by a standard zero forcing technique, as long as $N_R \geq N_T$, which minimizes the least square error as:

$$\tilde{x}[n]=(H^T H)^{-1} H^T y[n] \quad (3)$$

The above technique of decoding is known as zero forcing. In some cases H may be ill-conditioned (low rank) and the pseudo-inverse may be very sensitive to noise. To avoid sensitivity to noise, Minimum Mean Square Error (MMSE) uses the following equation:

$$\tilde{x}[n]=(H^T H - N)^{-1} H^T y[n] \quad (4)$$

In equation (4), N is a diagonal matrix. $N_{ii}$ is the noise floor value of the receiver i.

An example showing how blind estimation can be performed will now be described. When $\mathcal{K}$ new packets arrive (such as packet $P_1$ and packet $P_2$ in FIGS. 4B and 4C) with $N_T$ concurrent transmissions in a previous steady state phase, equation (1) can be rewritten as:

$$y_i[n] = \sum_{k}^{N_T} h_{ik} \cdot e^{j2\pi \Delta f_{ik} nT_s} \cdot x_k[n] + \sum_{l}^{\mathcal{K}} h_{il} \cdot e^{j2\pi \Delta f_{il} nT_s} \cdot P[n-n_l] \quad (5)$$

In equation (5), $P[n]$ are the known preamble states, and $n_1$ is the arrival time of each packet, with $n_1$ being the earliest one. The terms $h_{ik}$, $f_{ik}$ have all been estimated for $i=1 \ldots N_T$ at each receiver j. Thus, the following unknown variables should be jointly decoded: (i) the samples from $N_T$ concurrent transmissions: $x_i[n]$, $\forall i=1 \ldots N_T$; (ii) $\mathcal{K}$ new packets' channel and CFO for each receiver: $h_{il}$, $f_{il}$, $\forall l=1 \ldots \mathcal{K}$, $i=1 \ldots N_R$.

It is possible to reduce the unknown number of CFOs from $\mathcal{K} N_R$ to $\mathcal{K}$. The reason why this is possible relies on the observation that the CFOs among base stations remain constant for several seconds and can be measured periodically. Thus, knowing the CFO to any single base station makes it possible to derive the same for the remaining base station. Let the CFO among two base stations i and j as $\delta_{ij}$ be known. Therefore, the blind distributed MU-MIMO service only needs to estimate one CFO variable between transmitter k and a reference receiver r, which is $\Delta f_{rk}$. The rest of the CFO values can be obtained as $\Delta f_{jk}=\Delta f_{rk}+\delta_{rj}$. Utilizing the known clock offsets among receivers reduces the number of CFO variables from $N_R$ to one for each transmitter.

The known preambles provide an opportunity to decode all these unknowns. With M samples, $N_R \cdot M$ equations are accumulated, and an attempt is made to solve $N_T \cdot M$ data sample variables, $\mathcal{K}$ CFO variables, and $\mathcal{K} N_R$ channel variables. The goal of this approach is to estimate the unknowns by solving the over-determined set of equations in a least mean square sense.

A challenge in solving the equations formed by equation (5) is that the set of equations are non-linear due to the CFO terms which are multiplied with the unknown channel variables. The equations in equation (5) can be arranged into the form of Ax=b, where x represents the vector containing all the unknowns: $\mathcal{K} N_R$ channel variables ($h_{jk}$, $k=1 \ldots \mathcal{K}$, $j=1 \ldots N_R$) and $N_T \cdot M$ sample variables ($x_i[n]$, $i=1 \ldots N_T$). The term A represents the coefficients, which contain the CFO values. Treating the CFO values as known values, a least square approach can be used to solve the over-determined linear equations, with the residual error as $\|A\tilde{x}-b\|^2$, where $\tilde{x}=(A^T A)^{-1} A^T b$ (based on equation (4) for MMSE). Therefore, the following optimization problem can be formulated to estimate CFO and solve for data samples concurrently.

$$\underset{\Delta f_{rk}, \forall k=1 \ldots \mathcal{K}}{\text{minimize}} \|A\tilde{x} - b\|^2$$

$$\text{subject to} \quad \tilde{x} = (A^T A)_1 A^T b,$$

$$\Delta f_{jk} = \Delta f_{rk} + \delta_{rj},$$

$$\forall j = 1 \ldots N_R, j \neq k, \forall k = 1 \ldots \mathcal{K}.$$

As one example, the Nelder-Mead Optimization can be used for the above non-linear optimization.

A discussion of the conditions for blind estimation will now be provided. After $MT_S$ time in the blind estimation state, $MN_R$ equations have been accumulated corresponding to M received I/Q samples at each of the $N_R$ receivers. There are $MN_T$ number of unknown data samples to be estimated for the $N_T$ ongoing transmissions from the previous steady state phase. In addition, there are $\mathcal{K} N_R$ unknown channels and $N_R$ CFOs for the $\mathcal{K}$ new transmissions. Thus, in order to solve for the unknowns:

$$MN_R \geq MN_T + (N_R+1)\mathcal{K} \quad (6)$$

Equation (6) can be referred to as the blind estimation sufficiency condition (BESC). As discussed above, FIG. 3 shows the blind distributed MU-MIMO service transitioning 328 from the blind estimation state 322 into the steady state 324 in response to the blind estimation sufficiency condition being satisfied. Equation (6) represents the worst case scenario, since if some transmissions end earlier then the number of unestimated data samples will be less than $MN_T$.

In order for equation (6) to be satisfied, the blind estimation phase must last at least M samples, where:

$$M_{min} \geq \frac{(N_R + 1)\mathcal{K}}{N_T - N_R} \quad (7)$$

From equation (7) it is clear that $N_R > N_T$, otherwise $\tau_0$ becomes unbounded. Thus, blind estimation requires one additional receiver than traditional MIMO, where $N_R \geq N_T$.

Equation (6) assumes that the I/Q samples from the $\mathcal{K}$ transmissions are known since they correspond to the preambles. If the blind estimation phase lasts longer than the duration of preamble length $L_P$ in samples (i.e., $M_{min} > L_P$), then the above assumption will no longer be true. Under this condition, the transmissions whose channels have not yet been estimated will add to the unknown data samples and the number of unknown data samples will grow faster than the number of equations. Thus, for blind estimation to work, the burst size should be limited to:

$$\mathcal{K}_{max} = \mathcal{K} \le \frac{(N_R - N_T)L_P}{N_R + 1} \quad (8)$$

Equation (8) can be referred to as a burst limit condition. Some examples showing how a blind distributed MU-MIMO service can recover and function under scenarios where the burst limit condition is violated will be discussed below.

A discussion will now be provided about various error conditions that a blind distributed MU-MIMO service can experience. In addition, some examples will be provided demonstrating how a blind distributed MU-MIMO service could recover from these error conditions.

One type of error condition involves preamble detection errors. There can in general be three kinds of preamble detection errors: (i) missed detection, where a preamble is completely missed; (ii) incorrect start of frame, where the starting point of the payload is incorrect; and (iii) false detection, where a preamble is detected when there was no transmission. Given that preambles are usually designed for robust detection, errors (i) and (ii) usually occur when the transmission is too weak compared to the others. Such weak transmissions are usually too weak to significantly degrade the decoding of the other transmissions. In the case of a falsely detected preamble (error (iii) mentioned above), the estimated channel amplitude is usually very small since there was no preamble in the first place. Thus, error (iii) also does not have a significant effect on the decoding process.

Another type of error condition can result when traffic bursts occur. When several devices begin transmitting within a very short time, traffic bursts occur. If either $N_T \ge N_R$ or $\mathcal{K} > \mathcal{K}_{max}$ (as defined in equation (8)), then in some embodiments a blind distributed MU-MIMO service will not be able to estimate the I/Q samples and decode packets. In some embodiments, a blind distributed MU-MIMO service as disclosed herein can detect if any of the above conditions are violated while trying to decode and take corrective action if necessary.

The recovery of a blind distributed MU-MIMO service from a large burst can depend on whether the underlying access is slotted (devices are time synchronized and their transmissions respect slot boundaries) or unslotted.

Consider a scenario where the underlying access is slotted. If multiple wireless devices (e.g., IoT devices) transmit at substantially the same time (e.g., within ±80 µs) a blind distributed MU-MIMO service as disclosed herein may not be able to distinguish their preambles and therefore may not be able to decode them separately. This can potentially be avoided by making the wireless devices add a small (e.g., a few milliseconds) random delay before their transmissions.

In circumstances where the burst limit is exceeded in a certain slot, it is possible that all the packets could be lost. However, a blind distributed MU-MIMO service as disclosed herein can be configured to return to the idle state at the end of each slot period so that the effect of the burst in the previous slot is not carried over to the next slot.

In the absence of slot boundaries, the inability to decode packets can get carried over to successive overlapping packets. This can potentially lead to a cascade of failures until the blind distributed MU-MIMO service returns to the idle state. While in some embodiments this will occur naturally as soon as the burst dissipates, it may be more efficient for the base station to explicitly signal the wireless devices (e.g., through a busy tone) to stall transmitting for a short period of time. This allows the blind distributed MU-MIMO service to return to the idle state and resume as usual.

Figure 6:
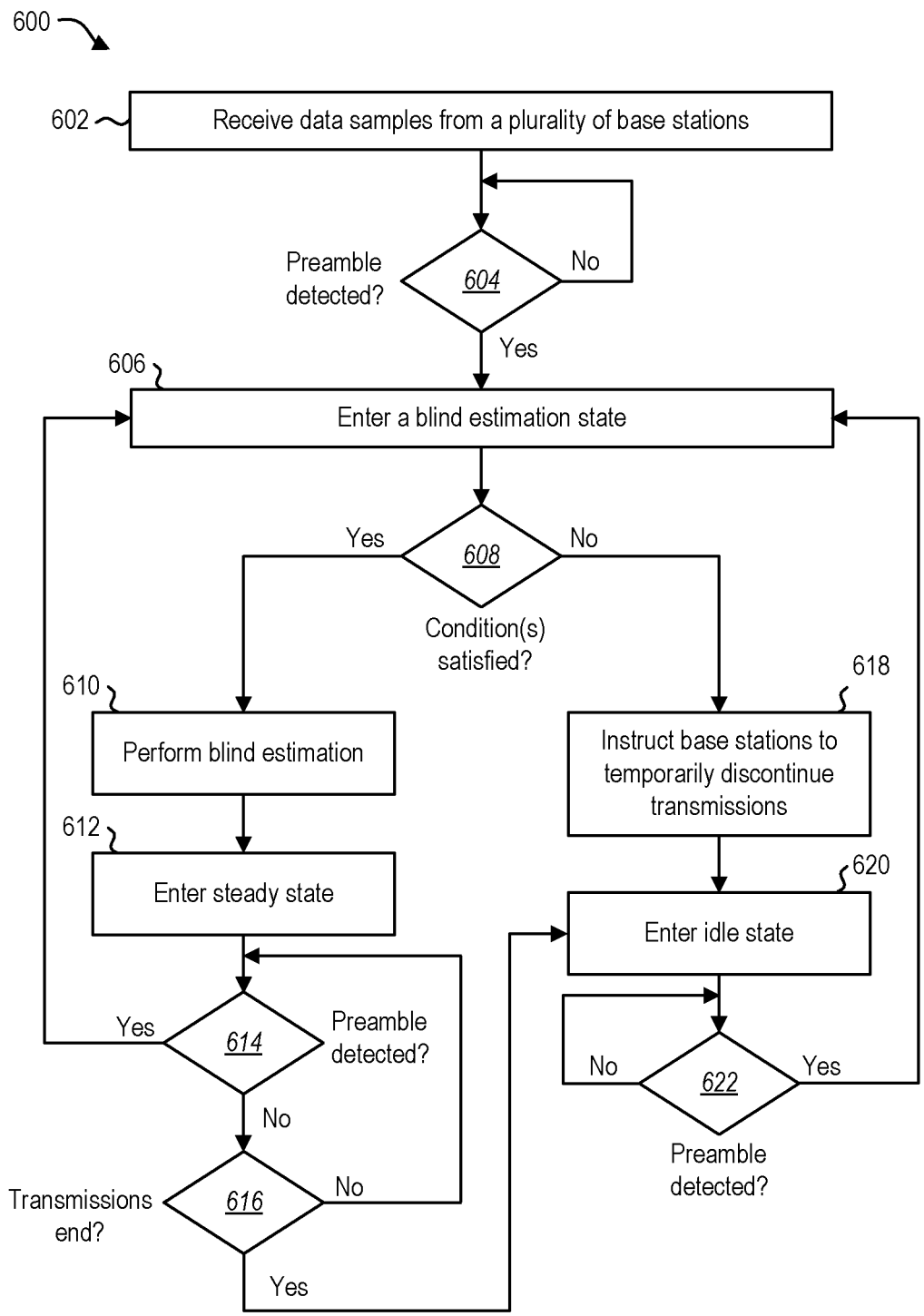
FIG. 6 illustrates another example of a method that can be implemented by a blind distributed MU-MIMO service, illustrating how a blind distributed MU-MIMO service can handle potential error conditions.

FIG. 6 illustrates another example of a method 600 that can be implemented by a blind distributed MU-MIMO service in accordance with the present disclosure. The method 600 shown in FIG. 6 illustrates how a blind distributed MU-MIMO service can handle potential error conditions. The method 600 will be described in relation to the blind distributed MU-MIMO service 206 in the system 200 shown in FIG. 2 as well as the state diagram shown in FIG. 3.

The method 600 includes receiving 602 data samples 216a-c from a plurality of base stations 202a-c and monitoring the received data samples 216a-c for the purpose of trying to detect a known preamble. In response to detecting 604 the known preamble, the blind distributed MU-MIMO service 206 can enter 606 a blind estimation state 322. While in the blind estimation state 322, the blind distributed MU-MIMO service 206 can determine 608 whether one or more conditions necessary for successfully performing blind estimation are satisfied. These conditions can include a blind estimation sufficiency condition, a minimum number of receivers condition, and/or a burst limit condition. In some embodiments, the blind estimation sufficiency condition can be the condition defined above in equation (6). The minimum number of receivers condition can be represented as the condition that $N_R > N_T$, as described above in connection with equation (7). The burst limit condition can be the condition defined above in equation (8).

If it is determined 608 that the condition(s) for performing blind estimation are satisfied, then the blind distributed MU-MIMO service 206 can perform 610 blind estimation in the manner described above. For example, the blind distributed MU-MIMO service 206 can use known preamble samples to attempt to simultaneously estimate (i) CFOs and channel parameters corresponding to the plurality of wireless devices 204a-c and the plurality of base stations 202a-c, and (ii) message data samples 210a'-c' corresponding to messages 208a-c that are sent by individual wireless devices 204a-c.

Once the CFOs and the channel parameters have been estimated, the blind distributed MU-MIMO service 206 can enter 612 a steady state 324. While in the steady state 324, the blind distributed MU-MIMO service 206 can use the estimated CFOs and the estimated channel parameters to estimate the message data samples 210a'-c', as discussed above.

If another preamble is detected 614 while the blind distributed MU-MIMO service 206 is in the steady state 324, then the blind distributed MU-MIMO service 206 can re-enter 606 the blind estimation state 322. The method 600 can then proceed as described above.

When it is determined 616 that transmissions from the plurality of wireless devices 204a-c have ended, then the blind distributed MU-MIMO service 206 can enter 620 an idle state 320. The blind distributed MU-MIMO service 206 can re-enter 606 the blind estimation state 322 when another preamble is detected 622.

If upon entering 606 the blind estimation state 322 it is determined 608 that one or more conditions for performing blind estimation are not satisfied, then the blind distributed MU-MIMO service 206 can attempt corrective action. As an example, the blind distributed MU-MIMO service 206 can instruct 618 the base stations 202*a-c* to signal the wireless devices 204*a-c* to temporarily discontinue transmissions. The blind distributed MU-MIMO service 206 can then enter 620 the idle state 320. The blind distributed MU-MIMO service 206 can re-enter 606 the blind estimation state 322 when another preamble is detected 622.

As indicated above, a blind distributed MU-MIMO service as disclosed herein can be implemented as a cloud computing service. In some embodiments, in order to facilitate real-time decoding and to enable scaling to a large number of base stations, a blind distributed MU-MIMO service can be implemented so that it is amenable to parallel execution. In other words, a blind distributed MU-MIMO service can be implemented so that it can be scaled to support real-time decoding for a large number of base stations making use of multiple cores in the cloud.

It is possible to instantiate separate instances of a blind distributed MU-MIMO service for different geographical regions that are far apart. This is possible because the different geographical regions are expected to have no common receiving base stations.

Figure 7:
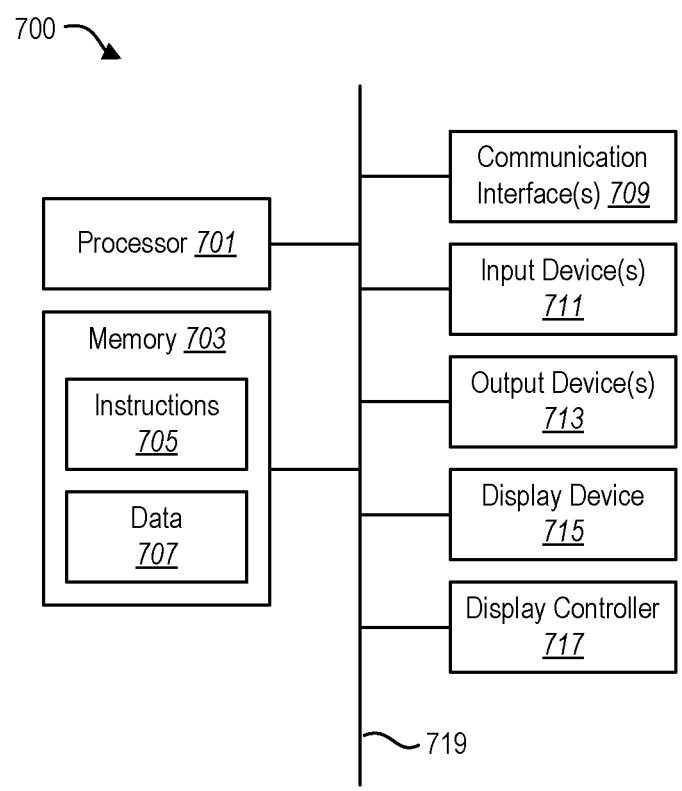
FIG. 7 illustrates certain components that can be included within a computing device.

One or more computing devices 700 can be used to implement at least some aspects of the techniques disclosed herein. FIG. 7 illustrates certain components that can be included within a computing device 700.

The computing device 700 includes a processor 701 and memory 703 in electronic communication with the processor 701. Instructions 705 and data 707 can be stored in the memory 703. The instructions 705 can be executable by the processor 701 to implement some or all of the methods, steps, operations, actions, or other functionality that is disclosed herein. Executing the instructions 705 can involve the use of the data 707 that is stored in the memory 703. Unless otherwise specified, any of the various examples of modules and components described herein can be implemented, partially or wholly, as instructions 705 stored in memory 703 and executed by the processor 701. Any of the various examples of data described herein can be among the data 707 that is stored in memory 703 and used during execution of the instructions 705 by the processor 701.

Although just a single processor 701 is shown in the computing device 700 of FIG. 7, in an alternative configuration, a combination of processors (e.g., an ARM and DSP) could be used.

The computing device 700 can also include one or more communication interfaces 709 for communicating with other electronic devices. The communication interface(s) 709 can be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 702.11 wireless communication protocol, a Bluetooth® wireless communication adapter, and an infrared (IR) communication port.

A computing device 700 can also include one or more input devices 711 and one or more output devices 713. Some examples of input devices 711 include a keyboard, mouse, microphone, remote control device, button, joystick, trackball, touchpad, and lightpen. One specific type of output device 713 that is typically included in a computing device 700 is a display device 715. Display devices 715 used with embodiments disclosed herein can utilize any suitable image projection technology, such as liquid crystal display (LCD), light-emitting diode (LED), gas plasma, electroluminescence, or the like. A display controller 717 can also be provided, for converting data 707 stored in the memory 703 into text, graphics, and/or moving images (as appropriate) shown on the display device 715. The computing device 700 can also include other types of output devices 713, such as a speaker, a printer, etc.

The various components of the computing device 700 can be coupled together by one or more buses, which can include a power bus, a control signal bus, a status signal bus, a data bus, etc. For the sake of clarity, the various buses are illustrated in FIG. 7 as a bus system 719.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment"

or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
  receiving data samples from a plurality of base stations, the data samples corresponding to a plurality of signals that are transmitted by a plurality of wireless devices and received at the plurality of base stations;
  detecting, based on the data samples, a known preamble indicating a new packet transmission;
  using known preamble samples to attempt to simultaneously estimate:
    carrier frequency offsets (CFOs) and channel parameters corresponding to the plurality of wireless devices and the plurality of base stations; and
    message data samples corresponding to messages sent by individual wireless devices;
  entering a steady state after the CFOs and the channel parameters have been estimated;
  while in the steady state, using the estimated CFOs and the estimated channel parameters to estimate the message data samples; and
  entering a blind estimation state in response to detecting another new packet transmission while in the steady state.

2. The method of claim 1, wherein:
  there are not any coordinated channel measurements between the plurality of wireless devices and the plurality of base stations; and
  the plurality of wireless devices transmit independently and at arbitrary times.

3. The method of claim 1, further comprising:
  entering the blind estimation state in response to detecting the known preamble; and
  estimating the CFOs, the channel parameters, and the message data samples while in the blind estimation state.

4. The method of claim 1, wherein:
  there are $N_T$ concurrent transmissions received at $N_R$ receivers in a previous steady state phase;
  the method further comprises entering the blind estimation state in response to arrival of $\mathcal{K}$ new packets; and
  simultaneously estimating the CFOs, the channel parameters, and the message data samples comprises waiting until M preamble samples have been received and then solving $N_R \cdot M$ non-linear equations for $N_T \cdot M$ data sample variables, $\mathcal{K}$ CFO variables, and $\mathcal{K} \cdot N_R$ channel variables.

5. The method of claim 1, further comprising:
  detecting that at least one condition that is necessary for successfully performing blind estimation is not satisfied; and
  instructing the plurality of base stations to signal the plurality of wireless devices to temporarily discontinue transmitting.

6. The method of claim 5, wherein:
  there are $N_T$ concurrent transmissions received at $N_R$ receivers in a previous steady state phase;
  $\mathcal{K}$ new packets are received in a current blind estimation phase;
  M samples are received in the current blind estimation phase;
  the at least one condition comprises a blind estimation sufficiency condition; and
  the blind estimation sufficiency condition is expressed as $MN_R \geq MN_T + (N_R+1)\mathcal{K}$.

7. The method of claim 5, wherein:
  there are $N_T$ concurrent transmissions received at $N_R$ receivers;
  the at least one condition comprises a minimum number of receivers condition; and
  the minimum number of receivers condition is represented as $N_R > N_T$.

8. The method of claim 5, wherein:
  there are $N_T$ concurrent transmissions received at $N_R$ receivers in a previous steady state phase;
  $\mathcal{K}$ new packets are received in a current blind estimation phase;
  M samples are received in the current blind estimation phase;
  the at least one condition comprises a burst limit condition; and
  the burst limit condition is expressed as $$\mathcal{K} \leq \frac{(N_R - N_T)L_P}{N_R + 1}.$$

9. The method of claim 1, wherein:
  communication between the plurality of wireless devices and the plurality of base stations occurs via wireless channels; and
  the wireless channels can each be represented by a single complex number.

10. The method of claim 1, wherein:
  the plurality of wireless devices comprise a plurality of Internet of Things (IoT) devices;
  the method is performed by a cloud computing service; and
  the cloud computing service receives the data samples from the plurality of base stations via an Internet connection.

11. A non-transitory computer-readable medium comprising instructions that are executable by one or more processors to cause a computing system to:
  receive data samples from a plurality of base stations, wherein the data samples correspond to a plurality of signals that are transmitted by a plurality of wireless devices and received at the plurality of base stations, and wherein the plurality of wireless devices transmit independently and at arbitrary times;
  detect, based on the data samples, a known preamble indicating a new packet transmission;
  enter a blind estimation state in response to detecting the known preamble;
  while in the blind estimation state, using known preamble samples to attempt to simultaneously estimate:

carrier frequency offsets (CFOs) and channel parameters corresponding to the plurality of wireless devices and the plurality of base stations; and message data samples corresponding to messages sent by individual wireless devices;

detect that at least one condition that is necessary for successfully performing blind estimation is not satisfied, wherein the at least one condition comprises at least one of a blind estimation sufficiency condition, a minimum number of receivers condition, or a burst limit condition; and instruct the plurality of base stations to signal the plurality of wireless devices to temporarily discontinue transmitting.

12. The computer-readable medium of claim 11, further comprising additional instructions that are executable by the one or more processors to:

enter a steady state after the CFOs and the channel parameters have been estimated;

while in the steady state, use the estimated CFOs and the estimated channel parameters to estimate the message data samples; and re-enter the blind estimation state in response to detecting another new packet transmission while in the steady state.

13. The computer-readable medium of claim 11, wherein:

there are $N_T$ concurrent transmissions received at $N_R$ receivers in a previous steady state phase;

the blind estimation state is entered in response to arrival of $\mathcal{K}$ new packets; and simultaneously estimating the CFOs, the channel parameters, and the message data samples comprises waiting until M preamble samples have been received and then solving $N_R \cdot M$ non-linear equations for $N_T \cdot M$ data sample variables, $\mathcal{K}$ CFO variables, and $\mathcal{K} \cdot N_R$ channel variables.

14. A system, comprising:

one or more processors;

memory in electronic communication with the one or more processors; and instructions stored in the memory, the instructions being executable by the one or more processors to:

receive data samples from a plurality of base stations, wherein the data samples correspond to a plurality of signals that are transmitted by a plurality of wireless devices and received at the plurality of base stations, and wherein the plurality of wireless devices transmit independently and at arbitrary times;

detect, based on the data samples, a known preamble indicating a new packet transmission;

enter a blind estimation state in response to detecting the known preamble;

while in the blind estimation state, using known preamble samples to simultaneously estimate carrier frequency offsets (CFOs), channel parameters corresponding to the plurality of wireless devices and the plurality of base stations, and message data samples corresponding to messages sent by individual wireless devices;

enter a steady state after the CFOs and the channel parameters have been estimated; and re-enter the blind estimation state in response to detecting another new packet transmission while in the steady state.

15. The system of claim 14, wherein:

there are $N_T$ concurrent transmissions received at $N_R$ receivers in a previous steady state phase;

the blind estimation state is entered in response to arrival of $\mathcal{K}$ new packets; and simultaneously estimating the CFOs, the channel parameters, and the message data samples comprises waiting until M preamble samples have been received and then solving $N_R \cdot M$ non-linear equations for $N_T \cdot M$ data sample variables, $\mathcal{K}$ CFO variables, and $\mathcal{K} \cdot N_R$ channel variables.

16. The system of claim 14, further comprising additional instructions that are executable by the one or more processors to:

detect that at least one condition that is necessary for successfully performing blind estimation is not satisfied; and instruct the plurality of base stations to signal the plurality of wireless devices to temporarily discontinue transmitting.

* * * * *